L. C. TRENT.
BEARING.
APPLICATION FILED MAR. 21, 1906. RENEWED APR. 22, 1909.

937,974.

Patented Oct. 26, 1909.

Witnesses:
Arthur L. Slee
J. Compton

Inventor:
L. C. Trent
by N. A. Acker
his atty

UNITED STATES PATENT OFFICE.

LAMARTINE C. TRENT, OF SAN FRANCISCO, CALIFORNIA.

BEARING.

937,974. Specification of Letters Patent. Patented Oct. 26, 1909.

Application filed March 21, 1906, Serial No. 307,281. Renewed April 22, 1909. Serial No. 491,597.

*To all whom it may concern:*

Be it known that I, LAMARTINE C. TRENT, a citizen of the United States, residing at the city and county of San Francisco, State of California, have invented certain new and useful Improvements in Bearings; and I do hereby declare the following to be a full, clear, and exact description of the same.

The present device is designed for use as a bearing for vertically disposed shafts and horizontally rotatable devices, such as agitators, working within liquid material such as pulp, slimes, concentrates, which carry sand, grit, dirt and other substances which quickly wear away and cut the bearing; the object of the invention being to protect the bearing against the action of the grit, sand, dirt and other substances carried by the fluid within which the bearing is submerged, thus prolonging the life of the bearing and providing for an easier working of the parts operating therein than where the bearing is exposed and subjected to the cutting action of the grit, contained in the material within which the bearing is submerged.

To comprehend the invention reference should be had to the accompanying sheet of drawings, wherein—

Figure 1:
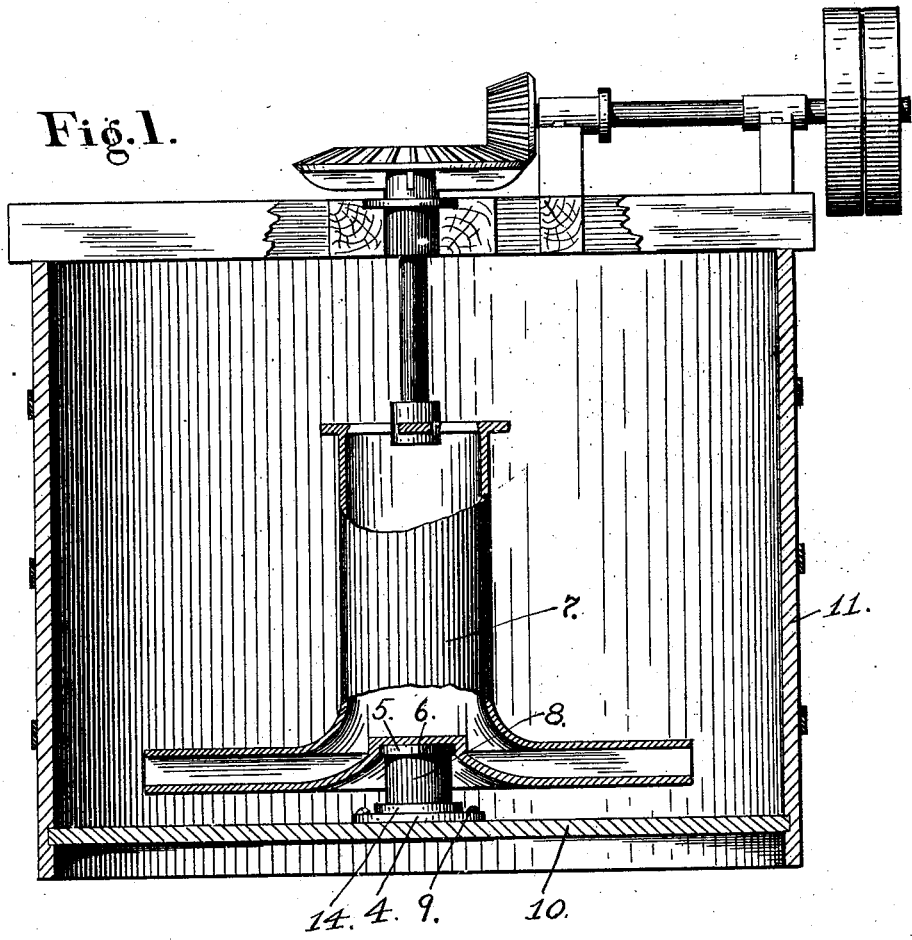
Figure 2:
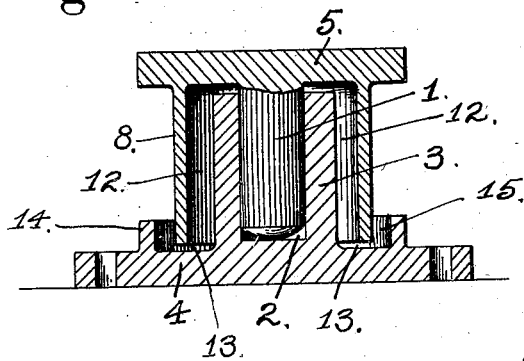

Figure 1 is a vertical sectional view of an agitator for pulp, the bearing being illustrated in adjusted position relative to the horizontally rotatable agitator; and Fig. 2 is a detail vertical sectional view of the bearing.

In the drawings the numeral 1 is used to indicate the rotatable member of the bearing, which member works within the bearing seat 2, formed in the stud 3 upwardly projecting from the base plate 4.

The member 1 may constitute the lower end of a horizontally rotatable shaft, although in the present case it is indicated as a downward extension of a head plate 5, which plate is secured within a counter-sunk seat 6 in the under face of a horizontally rotatable distributer 7. From this head plate 5, which may constitute a collar of the rotatable member 1, depends a circular flange 8, which flange surrounds the stud 3, of the base plate 4. In the present case the said base plate 4 is attached by bolts 9 to the bottom 10 of the receiving tank 11.

The depending circular flange 8 is of somewhat greater diameter than that of the socketed stud 3, so as to leave an annular chamber 12 between the rotatable member 1 and the fixed part or stud 3. The said flange 8 terminates a slight distance above the base plate 4, so as to establish communication between the annular chamber 12 and the outside. As the material in which the rotatable parts are to work is fed into the receiving tank 11 and rises above the point 13, the air is imprisoned in the annular air chamber 12, and as the liquid rises in the vat, it produces a pressure on the air proportional to the head of liquid in the vat, which prevents any of the dirt or gritty substance contained in the liquid within which the bearing is submerged from gaining access to the bearing seat 2 of the rotatable member 1, thereby securely protecting the said bearing seat from being cut or worn, as is the result where the gritty, cutting material has free access to the bearing seat for the rotating member working therein.

To more effectually protect the bearing seat, the base plate 4 may be formed with a circular flange 14, which flange extends upwardly a short distance beyond the lower edge of the circular flange 8, and forms an annular chamber 15 for the holding of a body of quick-silver to form a seal for the air within the chamber 12.

It is obvious that the described invention may be utilized in connection with any rotatable device the bearing of which is a submerged one.

Having thus described the invention, what is claimed as new and desired to be protected by Letters Patent is—

1. A submerged bearing for horizontally rotatable devices, the same comprising a tubular stud constituting a bearing seat for the rotatable member, and the rotatable member comprising a head plate, a shaft extending downwardly from the head plate and loosely fitting within the tubular stud, the shaft being constructed to support the head slightly above the upper end of the stud, and an annular flange extending downwardly from the head plate to surround the stud and terminating short of the lower end of the stud whereby is provided an air chamber between the flange and stud, the parts of the bearing being constructed to confine the air in said chamber.

2. In combination, a vat adapted to contain liquid material to be worked, a submerged bearing in the vat for horizontally rotatable devices, the same comprising a fixed member and a rotatable member working therein carrying an integral dependent circular flange, the lower edge of the flange being adjacent the base of the fixed member, the said fixed and rotatable members being constructed and arranged to form therebetween an annular air chamber, the liquid as it rises in the vat producing a pressure on the air in said chamber proportional to the height of the liquid in the vat, and a circular flange upwardly projecting from the base of the fixed member to a point slightly above the lower edge of the depending flange of the rotatable member.

L. C. TRENT.

Witnesses:
N. A. ACKER,
D. B. RICHARDS.